Figure 1:
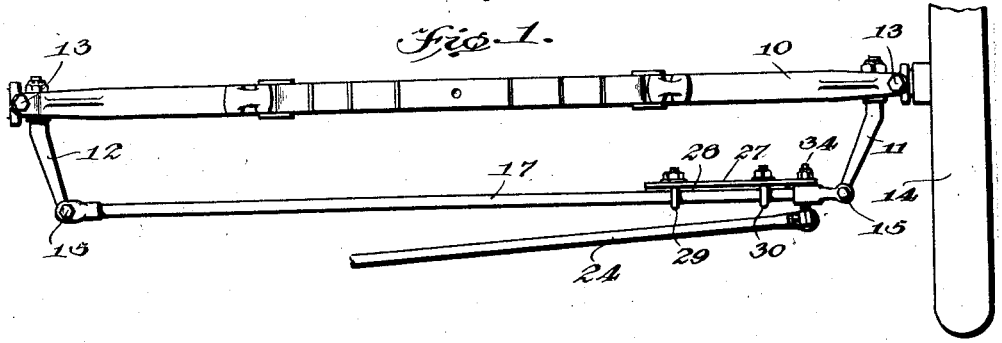

May 22, 1928.

W. E. COLEMAN

ATTACHMENT FOR STEERING RODS

Filed April 11, 1927

1,670,954

WITNESSES

INVENTOR
W. E. Coleman,
BY
ATTORNEYS

Patented May 22, 1928.

1,670,954

UNITED STATES PATENT OFFICE.

WILLIAM E. COLEMAN, OF SHREVEPORT, LOUISIANA.

ATTACHMENT FOR STEERING RODS.

Application filed April 11, 1927. Serial No. 182,826.

This invention relates to an attachment for the steering rod of an automobile. It is a well recognized fact that in certain types of steering rods for automobiles they will become loose from the connections so that when the steering post is operated the steering rod will tend to suddenly turn the automobile or in case of complete slippage of the steering rod the front wheels will be turned at a sharp angle whereby the automobile will be wrecked.

An object of the invention is the provision of an attachment for a steering rod to not only maintain the parts associated with the rod from rattling or working loose but for preventing the steering rod from slipping from its connections.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

Figure 2:
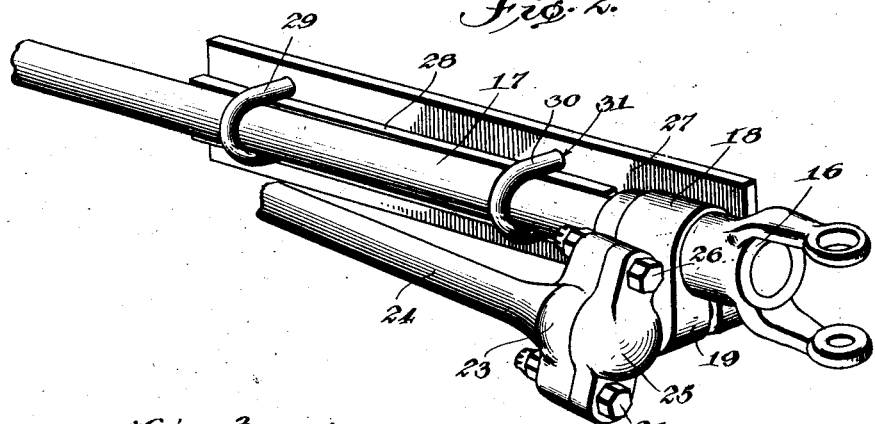
Figure 3:
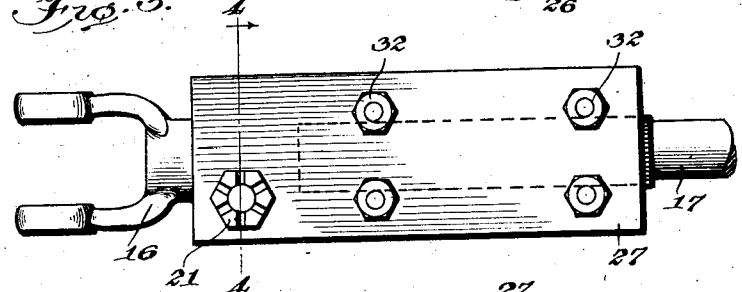
Figure 4:
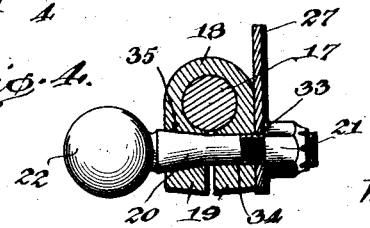

In the drawings:

Figure 1 is a fragmentary plan view showing my invention applied to the usual steering rod of a well known make of automobile, Figure 2 is a fragmentary view in perspective showing the attachment applied to the steering rod, Figure 3 is a longitudinal side view of the attachment, and Figure 4 is a vertical section taken along the line 4—4 of Figure 3.

Referring more particularly to the drawings, 10 designates a front axle having the usual spindle arms 11 and 12 connected to the usual spindle bolts 13 through which the front wheels 14 are adapted to be oscillated for steering purposes. The outer end of each spindle arm is adapted to support a spindle control rod bolt 15, said bolt being received by a yoke 16 carried at an end of a spindle control rod 17 which extends transversely across the chassis of the automobile and inwardly of the axle 10. At each end of the control rod is mounted a split collar 18 having depending ears 19. These ears have a transverse opening to receive a shank 20 of a steering rod bolt 34 which is usually secured in place by means of a nut 21 threaded onto the outer end of the bolt and in co-operation with a truncated portion 35 received within a complementarily formed socket in one of the ears 19 of the collar 18 so that as the nut 21 is drawn up tight the ears will be drawn in clamping relation for tightly securing the collar 18 in position on the control rod 17.

An end of the steering bolt 34 is provided with a ball 22 adapted to be received in one portion 23 of a socket formed at the end of a steering rod 24. A cap 25 forming the supplementary member of the socket is secured to the member 23 by means of bolts 26. The steering rod 24 is connected in the usual manner, not disclosed, to the steering post whereby rotation of the steering post will cause actuation of the steering rod and the arms 11 and 12.

Since the steering rod tends to slip from its position I have provided a particular means for preventing slippage or loosening of the steering rod from its connection with the steering rod bolt. For this purpose I have provided a metal plate 27 which extends longitudinally of a portion of the control rod 17 and terminates at its outer end adjacent the outer end of the control rod 17 and inwardly of the yoke 16. The spacing block 28 is located between the plate 27 and the control rod 17 and the width of this plate depends upon the space between the rod 17 and the plate 27 when the outer end of the plate is in position as shown in Figure 2, since this plate is in contact with the outer face of one of the ears 19 of the collar 18. The spacing block 28 may be formed separately or integrally with the plate 27. U-bolts 29 and 30 embrace the control rod 17 and are inserted through perforations 31 in the plate 27 and have their legs in engagement with the edges of the spacing block 28. Nuts 32 are threaded onto the ends of the U-bolts for locking said U-bolts in clamping relation with the plate 27, the block 28 and the control rod 17.

The plate 27 is perforated, as shown at 33 in Fig. 4, to receive the outer end of the shank 20 of the bolt 34. The nut 21 is screwed up tight upon the outer face of the plate 27. By this construction it will be seen that the steering rod is properly supported and maintained against slippage by reason of the plate 27 and the U-bolts 29 and 30 and the nut 21 engaging the outer face of the plate 27.

I claim:

1. A device of the character described comprising a control rod having a collar, a steering rod bolt carried by the collar, a plate, means for clamping the plate to the control rod, said plate being provided with a perforation to receive one end of the steering rod bolt, and a nut threaded onto the bolt and engaging the outer face of the plate.

2. A device of the character described comprising a control rod having a collar, a steering rod bolt carried by the collar, a plate, means for clamping the plate to the control rod, said plate being provided with a perforation to receive one end of the steering rod bolt, and a nut threaded onto the bolt and engaging the outer face of the plate, and a spacing block located between the control rod and said plate.

3. A device of the character described comprising a spindle control rod, a collar supported on one end of the rod and having depending ears provided with an opening, a bolt received within the opening, a plate, U-bolts for clamping the plate to the control rod, said plate having one end in engagement with one of the ears and provided with a perforation aligning with the opening in the ears, and a nut threaded on the end of the bolt and in engagement with the outer face of the plate.

WILLIAM E. COLEMAN.